(12) United States Patent
Kim et al.

(10) Patent No.: US 11,686,830 B2
(45) Date of Patent: Jun. 27, 2023

(54) METHOD AND SYSTEM FOR CALCULATING REFERENCE VALUE OF ULTRASONIC SENSOR

(71) Applicant: SAMSUNG DISPLAY CO., LTD., Yongin-si (KR)

(72) Inventors: Mi Young Kim, Yongin-si (KR); Kyoung Hun Been, Yongin-si (KR); Byeong Kyu Jeon, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 17/824,241

(22) Filed: May 25, 2022

(65) Prior Publication Data
US 2023/0077149 A1 Mar. 9, 2023

(30) Foreign Application Priority Data
Sep. 8, 2021 (KR) .................. 10-2021-0119967

(51) Int. Cl.
G01S 7/52 (2006.01)
G06V 40/13 (2022.01)
G06F 21/32 (2013.01)
G01S 15/89 (2006.01)
G06T 7/00 (2017.01)

(52) U.S. Cl.
CPC ...... *G01S 7/52004* (2013.01); *G01S 15/8906* (2013.01); *G06F 21/32* (2013.01); *G06T 7/97* (2017.01); *G06V 40/1306* (2022.01)

(58) Field of Classification Search
None
See application file for complete search history.

(56) References Cited

U.S. PATENT DOCUMENTS

2016/0313439 A1* 10/2016 Min .................. G01S 7/539
2022/0043144 A1*  2/2022 Yanni ............... G01S 7/52028

FOREIGN PATENT DOCUMENTS

KR           10-1482930          1/2015

* cited by examiner

*Primary Examiner* — Nicholas J Lee
(74) *Attorney, Agent, or Firm* — F. Chau & Associates, LLC

(57) ABSTRACT

A method for calculating a reference value of an ultrasonic sensor includes: transmitting a first ultrasonic signal from the ultrasonic sensor toward a first surface of a contact device while an object is positioned on the first surface; generating a plurality of ultrasonic images based on a first ultrasonic echo signal; selecting an ultrasonic image having a highest similarity to a reference image from among the ultrasonic images; storing a first parameter and a second parameter corresponding to a selected ultrasonic image; while the object is not positioned on the first surface, transmitting a second ultrasonic signal based on the first parameter from the ultrasonic sensor toward the first surface; and calculating the reference value of the ultrasonic sensor using the second parameter and a second ultrasonic echo signal.

20 Claims, 6 Drawing Sheets

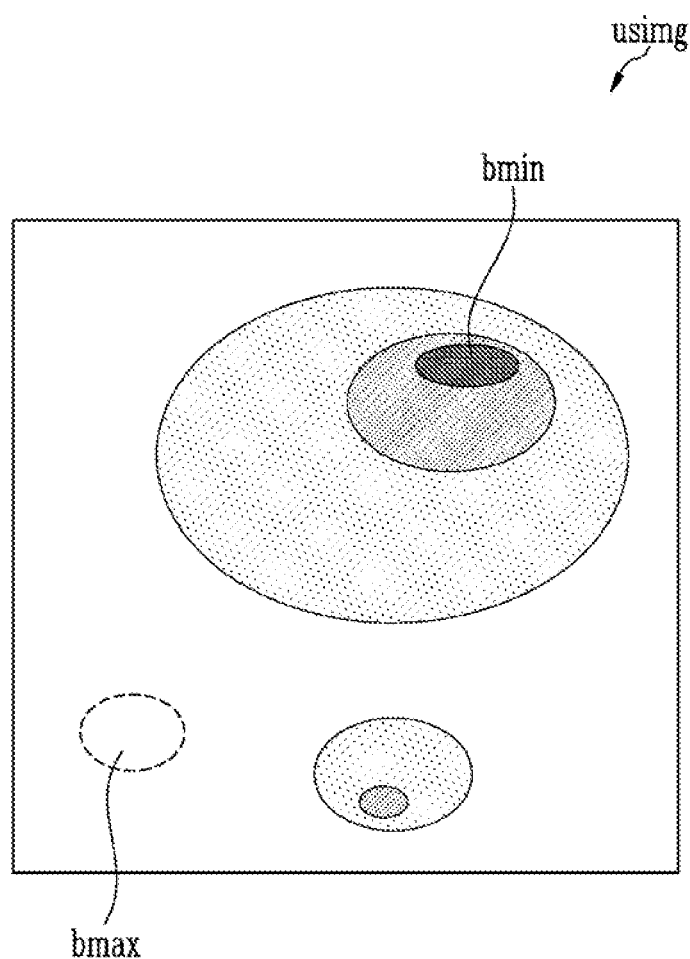

METHOD AND SYSTEM FOR CALCULATING REFERENCE VALUE OF ULTRASONIC SENSOR

CROSS-REFERENCE TO RELATED APPLICATION

The application is based on and claims priority under 35 U.S.C. § 119 to Korean Patent Application No. 10-2021-0119967, filed Sep. 8, 2021, the disclosure of which is incorporated by reference herein in its entirety.

TECHNICAL FIELD

The present disclosure relates to a method and system for calculating a reference value of an ultrasonic sensor.

DISCUSSION OF THE RELATED ART

Display devices have seen increased demand from consumers in recent times. Display devices are used to facilitate a connection between users and information. Accordingly, the use of many types of display devices such as liquid crystal displays, an organic light emitting displays, and others has also increased.

Display devices may include various sensors such as touch sensors, fingerprint sensors, illuminance sensors (such as a brightness sensor), and cameras. In some display devices, a fingerprint sensor is attached to the rear surface of a display panel and can recognize ridges and valleys of a fingerprint based on information of a carrier (for example, ultrasonic waves or light) passing through the display panel. This technology allows a user to place a finger on the display, for example, to authenticate the user, without disturbing the image underneath it.

However, since the material, laminate structure, layout, and other properties of the display panel may vary across devices, it is necessary to check whether an ultrasonic sensor exhibits effective performance in the corresponding display panel. If the ultrasonic sensor does not exhibit effective performance, it is necessary to change the material, laminate structure, layout, etc. of the display panel. It is therefore important to ensure the accuracy and sensitivity of this ultrasonic sensor before the display device reaches an end user.

SUMMARY

The present disclosure provides a method and system for calculating a reference value of an ultrasonic sensor, where the ultrasonic sensor is capable of calculating a reference value as a measure of the effective performance of the ultrasonic sensor with respect to a display panel.

A method for calculating a reference value of an ultrasonic sensor according to an embodiment of the present invention includes: while an object is positioned on a first surface of a contact device, transmitting a first ultrasonic signal from the ultrasonic sensor toward the first surface; generating a plurality of ultrasonic images based on a first ultrasonic echo signal; selecting an ultrasonic image having a highest similarity to a reference image from among the ultrasonic images; storing a first parameter and a second parameter corresponding to a selected ultrasonic image; while the object is not positioned on the first surface, transmitting a second ultrasonic signal based on the first parameter from the ultrasonic sensor toward the first; and calculating the reference value of the ultrasonic sensor using the second parameter and a second ultrasonic echo signal reflected from the second ultrasonic signal.

A larger reference value results in a smaller deviation of sensing values for each position of the ultrasonic sensor.

The first parameter may be a frequency of the first ultrasonic signal used to generate the selected ultrasonic image.

In the transmitting the second ultrasonic signal, the second ultrasonic signal has a frequency corresponding to the first parameter.

The second parameter may be a reception delay time of the first ultrasonic echo signal corresponding to the selected ultrasonic image from among the generated plurality of ultrasonic images.

The ultrasonic sensor may be positioned on a second surface of the contact device, and the second surface may be a surface opposite to the first surface.

The contact device may have no air gap between the first surface and the second surface.

The contact device may be a display panel.

The reference value may correspond to a difference between a maximum pressure value and a minimum pressure value of the second ultrasonic echo signal within a specific time range based on the second parameter.

The reference value may correspond to a median value of pressure values of the second ultrasonic echo signal within a specific time range based on the second parameter.

A system for calculating a reference value of an ultrasonic sensor according to an embodiment of the present invention includes a contact device having a first surface; an ultrasonic sensor configured to transmit an ultrasonic signal toward the first surface and to generate an ultrasonic image based on an ultrasonic echo signal reflected from the ultrasonic signal; and a measuring device configured to calculate the reference value of the ultrasonic sensor using the ultrasonic echo signal. The ultrasonic sensor transmits a first ultrasonic signal while an object is positioned on the first surface, the ultrasonic sensor generates a plurality of ultrasonic images based on a first ultrasonic echo signal, the measuring device selects an ultrasonic image having a highest similarity to a reference image from among the ultrasonic images, and stores a first parameter and a second parameter corresponding to a selected ultrasonic image, the ultrasonic sensor transmits a second ultrasonic signal based on the first parameter while the object is not positioned on the first surface, and the measuring device calculates the reference value of the ultrasonic sensor using the second parameter and a second ultrasonic echo signal reflected from the second ultrasonic signal.

A larger reference value may indicate a smaller deviation of sensing values for each position of the ultrasonic sensor.

The first parameter may be a frequency of the first ultrasonic signal used to generate the selected ultrasonic image.

The ultrasonic sensor may transmit the second ultrasonic signal with a frequency corresponding to the first parameter.

The second parameter may be a reception delay time of the first ultrasonic echo signal used to generate the selected ultrasonic image.

The ultrasonic sensor may be positioned on a second surface of the contact device, and the second surface may be a surface opposite to the first surface.

The contact device may have no air gap between the first surface and the second surface.

The contact device may be a display panel.

The reference value may correspond to a difference between a maximum pressure value and a minimum pressure value of the second ultrasonic echo signal within a specific time range based on the second parameter.

The reference value may correspond to a median value of pressure values of the second ultrasonic echo signal within a specific time range based on the second parameter.

BRIEF DESCRIPTION OF THE DRAWINGS

The accompanying drawings, which are included to provide a further understanding of the inventive concepts, and are incorporated in and constitute a part of this specification, illustrate embodiments of the inventive concepts, and, together with the description, serve to explain principles of the inventive concepts.

FIG. 8 is a diagram of an example of evaluating the performance of the ultrasonic sensor using the reference value.

DETAILED DESCRIPTION OF THE EMBODIMENTS

Figure 1:
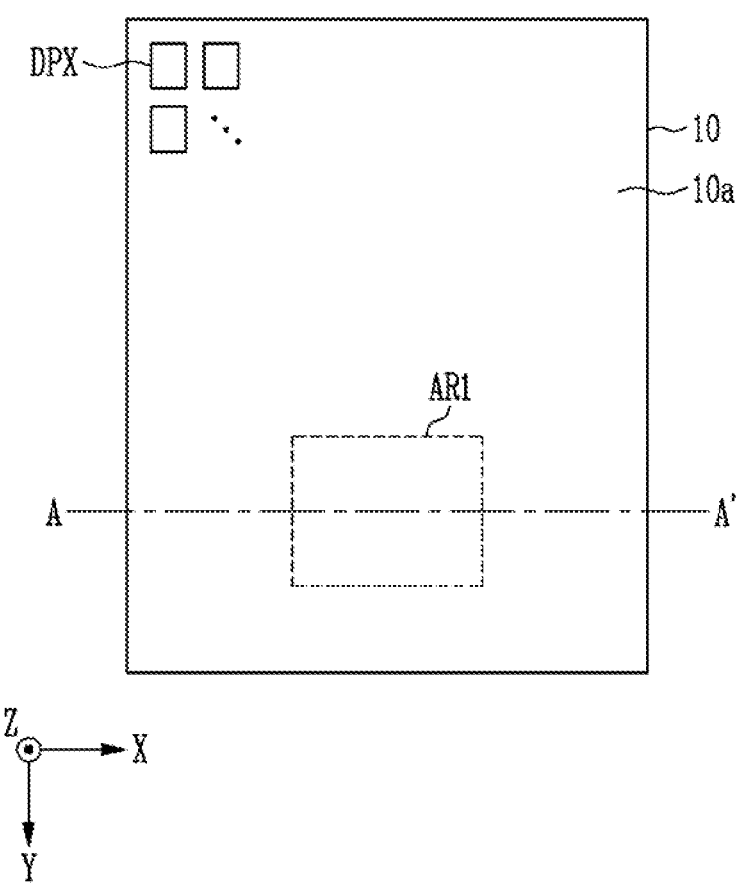
FIG. 1 is a diagram of a display device according to an embodiment of the present disclosure.

Hereinafter, various embodiments of the present disclosure will be described in detail with reference to the accompanying drawings so that those of ordinary skill in the art may easily implement the inventive concepts described herein. The present inventive concepts may be embodied in various different forms and is not limited to the embodiments described herein.

In order to clearly describe the present invention, parts that are not related to the description are omitted, and the same or similar components are denoted by the same reference numerals throughout the specification. The components and their reference numerals described herein may be used in in more than one drawing, for example.

In addition, the size and thickness of each component shown in the drawings are arbitrarily shown for convenience of description, and thus the present disclosure is not necessarily limited to the forms shown in the drawings. In the drawings, thicknesses may be exaggerated to clearly express the layers and regions.

In addition, as used herein, the expression "is the same" may mean "substantially the same". That is, the items being described may be similar enough in their measurements and/or properties so as not to differ in any meaningful way, as would be understood by ordinary skill in the art. In other expressions, "substantially" may be omitted.

Figure 2:
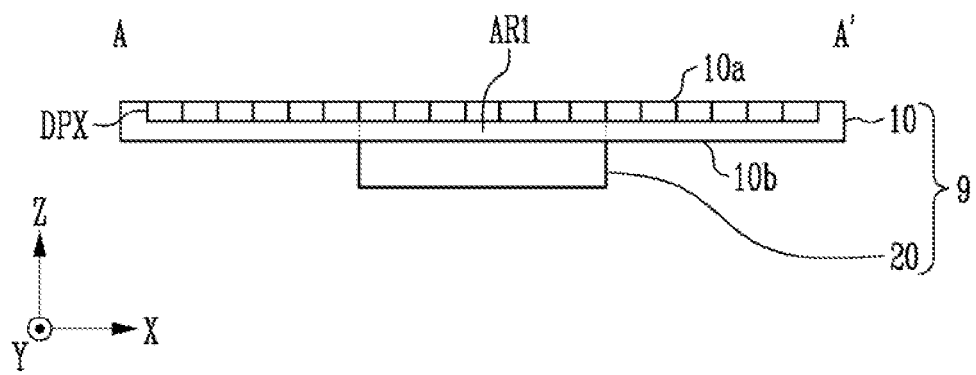
FIG. 2 is a cross-sectional view taken along line A-A' of FIG. 1.
Figure 3:
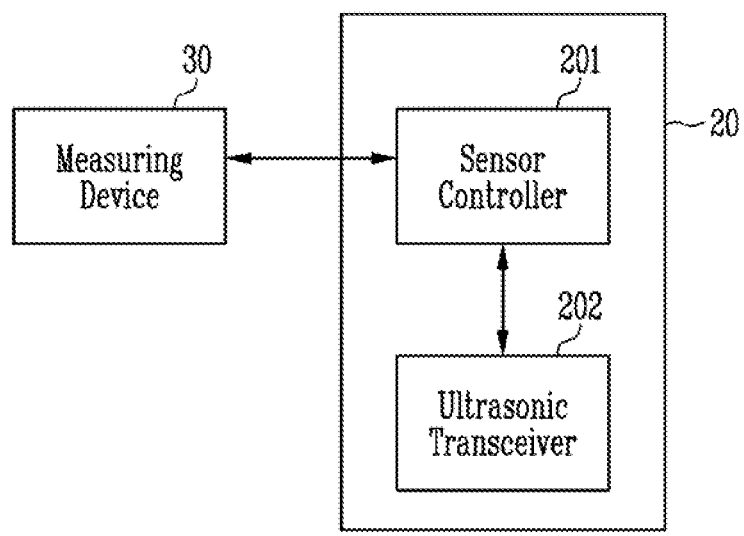
FIG. 3 is a diagram of a relationship between an ultrasonic sensor and a measuring device.

FIG. 1 is a diagram of a display device according to an embodiment of the present disclosure. FIG. 2 is a cross-sectional view taken along line A-A' of FIG. 1. FIG. 3 is a diagram of a relationship between an ultrasonic sensor and a measuring device.

Referring to FIGS. 1, 2 and 3, a display device 9 may include a display panel 10 and an ultrasonic sensor 20.

The display panel 10 may include display pixels DPX. The display pixels DPX may be arranged on a plane that extends in a first direction X and a second direction Y. The display pixels DPX may be arranged in a flat shape, but may also be arranged in a curved shape in some embodiments.

For example, a side surface of the display panel 10 may have a curved shape, and the display pixels DPX disposed on the side surface of the display panel 10 may be arranged in along the curved shape. The display pixels DPX may display an image by emitting light in a third direction Z. A user may then look at a first surface 10a of the display panel 10 to view the displayed image. The display panel 10 may be for example, a micro light-emitting diode (LED) display panel using a micro-LED, a quantum dot light-emitting display panel using a quantum dot light-emitting diode including a quantum dot emission layer, or an inorganic light-emitting display panel using an inorganic light-emitting element including inorganic semiconductor. The first direction X, the second direction Y, and the third direction Z may be directions that are orthogonal to each other.

The ultrasonic sensor 20 may include a sensor controller 201 and an ultrasonic transceiver 202. The ultrasonic sensor 20 (or the ultrasonic transceiver 202) may overlap a first area AR1 of the display panel 10. For example, the ultrasonic sensor 20 (or the ultrasonic transceiver 202) may be disposed on a second surface 10b of the display panel 10. The second surface 10b may be a surface opposite to the first surface 10a. The ultrasonic sensor 20 may be a sensor that uses ultrasonic waves as a carrier, and may be used as a fingerprint sensor and/or as a health diagnosis sensor (for example, for sensing blood flow, pulse, etc. from a finger). However, for convenience of description, embodiments in which the ultrasonic sensor 20 is a fingerprint sensor will be described herein.

The ultrasonic sensor 20 may transmit an ultrasonic signal toward the first surface 10a and generate an ultrasonic image based on a reflected ultrasonic echo signal. For example, when the sensor controller 201 determines a parameter of the ultrasonic signal (for example, a frequency of the ultrasonic signal), the ultrasonic transceiver 202 may transmit the ultrasonic signal corresponding to the determined parameter. When the ultrasonic transceiver 202 receives the ultrasonic echo signal, the sensor controller 201 may generate the ultrasonic image using the ultrasonic echo signal. In this case, the sensor controller 201 may generate a plurality of ultrasonic images according to a plurality of reception times of the ultrasonic echo signal. A difference between a transmission time of the ultrasonic signal and a reception time of the ultrasonic echo signal may be defined as a reception delay time (or range gate delay).

A contact device for the ultrasonic sensor 20 is not necessarily limited to the display panel 10. For example, the contact device may be a non-display device such as a cover for the ultrasonic sensor 20. Provided there is no air gap between the first surface 10a and the second surface 10b, any contact device for the ultrasonic sensor 20 may be applied to the embodiments of the present disclosure. If there is an air gap, it may be difficult for the ultrasonic sensor 20 to exhibit effective performance because the ultrasonic signal does not pass well through air. Hereinafter, the display panel 10 will be described as a contact device 10.

A measuring device 30 may be implemented as a general-purpose computer or a measurement specific integrated circuit. The measuring device 30 may transmit/receive data to and from the sensor controller 201. For example, the measuring device 30 may calculate a reference value of the ultrasonic sensor 20 using the ultrasonic echo signal. This calculation process will be described in more detail below with reference to FIG. 4.

FIGS. 4 to 7 are diagrams of a method for calculating a reference value of an ultrasonic sensor according to an embodiment of the present disclosure.

Figure 4:
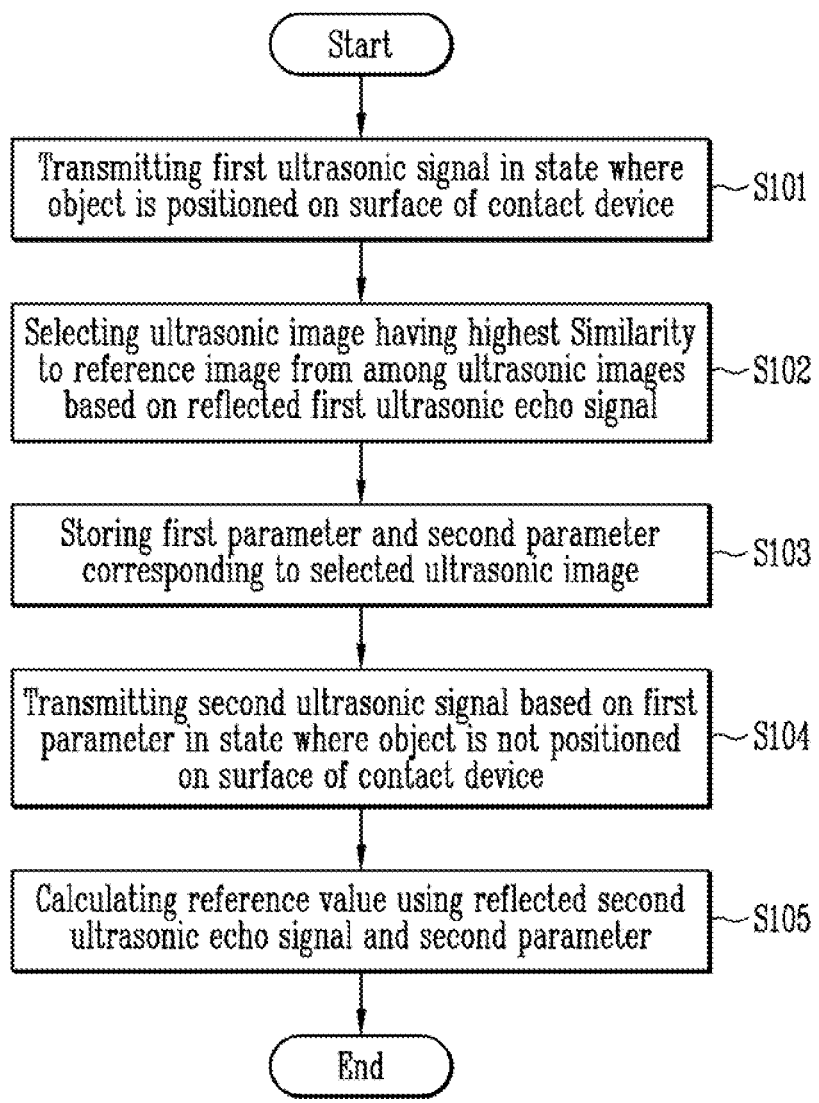
FIGS. 4 to 7 are diagrams of a method for calculating a reference value of an ultrasonic sensor according to an embodiment of the present disclosure.
Figure 5:
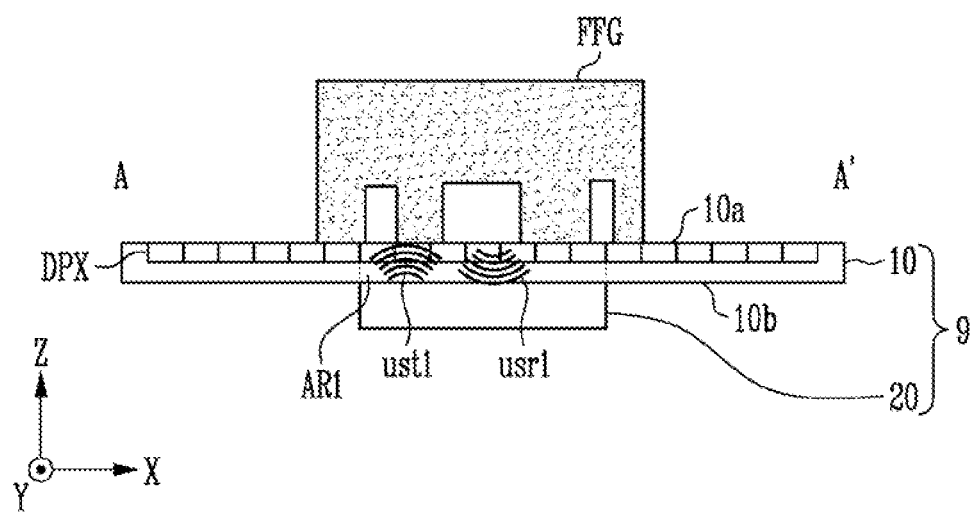

Referring to FIGS. 4 and 5, the ultrasonic sensor 20 may transmit a first ultrasonic signal ust1 toward the first surface 10a (S101) when a model (or an object) FFG is positioned on the first surface 10a of the contact device 10.

Here, the model FFG may be similar to or the same as a sensing target of the ultrasonic sensor 20. For example, when the ultrasonic sensor 20 is a fingerprint sensor, the sensing target may be a fingerprint. In this case, a surface of the model FFG in contact with the first surface 10a may have ridges and valleys like a human fingerprint. For example, the model FFG may be made of a material such as rubber or polydimethylsiloxane (PDMS), and may be constructed to have similar dimensions and physical properties as a human finger.

Next, the ultrasonic sensor 20 may generate the plurality of ultrasonic images based on a first ultrasonic echo signal usr1 reflected from the first ultrasonic signal ust1 (S102). As described above, the ultrasonic sensor 20 may generate different ultrasonic images for different reception delay times. The measuring device 30 may select an ultrasonic image having the highest similarity to a reference image from among generated ultrasonic images (S102). For example, the reference image may be an image in which the ridges and valleys of the model FFG are clearly distinguished.

Next, the measuring device 30 may store a first parameter pm1 and a second parameter pm2 corresponding to the selected ultrasonic image (S103). For example, the first parameter pm1 may be a frequency of the first ultrasonic signal ust1 used to generate the selected ultrasonic image. For example, the second parameter pm2 may be the reception delay time of the first ultrasonic echo signal usr1 used to generate the selected ultrasonic image. Accordingly, the measuring device 30 may store driving conditions (for example, including the first parameter pm1 and the second parameter pm2) that are the most suitable for the material, laminate structure, layout, etc. of the contact device 10. For example, these driving conditions may allow the contact device 10 that has measured the conditions to produce the most accurate ultrasonic images, thereby allowing a user to authenticate into the device with increased security, accuracy, and speed.

Figure 6:
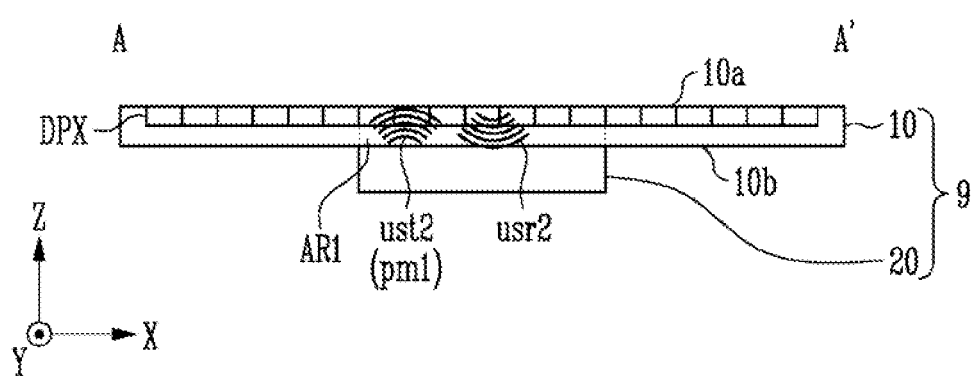

Next, referring to FIG. 6, the ultrasonic sensor 20 may transmit a second ultrasonic signal ust2 based on the first parameter pm1 in a state where the model FFG is not positioned on the first surface 10a (S104). For example, the second ultrasonic signal ust2 may have a frequency corresponding to the first parameter pm1.

Figure 7:
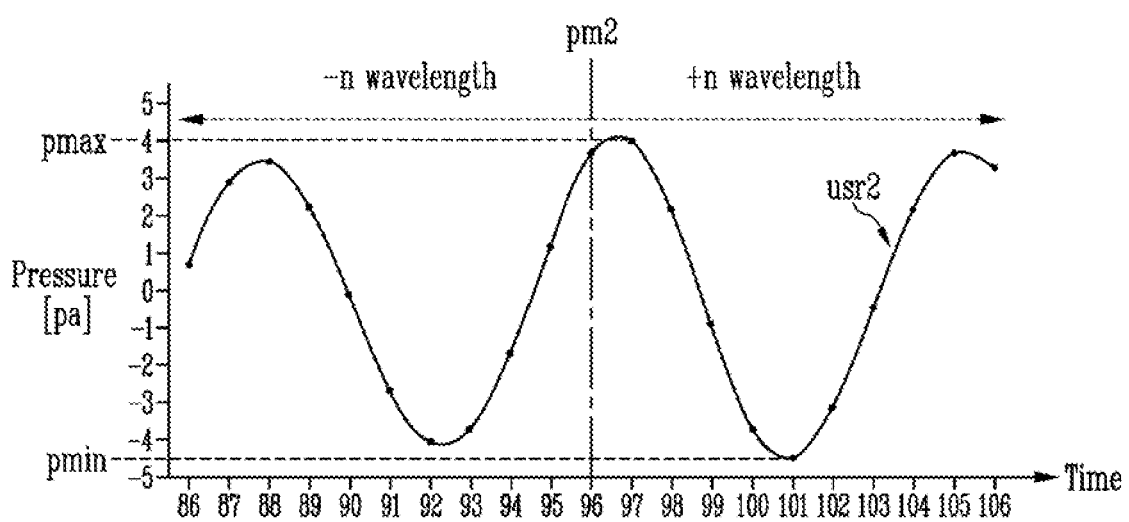

The measuring device 30 may calculate the reference value of the ultrasonic sensor 20 using a second ultrasonic echo signal usr2 reflected from the second ultrasonic signal ust2 and the second parameter pm2 (S105). Referring to FIG. 7, a change in pressure of the second ultrasonic signal usr2 according to time is shown as an example. Here, the time on the horizontal axis corresponds to the reception delay time.

In an embodiment, the reference value may be set as a difference between a maximum pressure value pmax and a minimum pressure value pmin of the second ultrasonic echo signal usr2 within a specific time range based on the second parameter pm2. The specific time range may be determined as a range of a −n wavelength and a +n wavelength based on the reception delay time corresponding to the second parameter pm2, where n may be an integer greater than 0. Here, the wavelength may mean a wavelength of the second ultrasonic echo signal usr2.

In an embodiment, the reference value may be set as a median value of pressure values of the second ultrasonic echo signal usr2 within a specific time range based on the second parameter pm2.

FIG. 8 is a diagram of an example of evaluating the performance of the ultrasonic sensor using the reference value.

The reference value calculated with reference to FIGS. 4 to 7 may be a reference value for determining the uniformity of the ultrasonic sensor 20. For example, the larger the reference value, the smaller a deviation of sensing values for each position of the ultrasonic sensor 20. For example, when the reference value is relatively large, the sensing values for each position of the ultrasonic sensor 20 may be uniform. As the deviation of the sensing values becomes smaller (more uniform), the ultrasonic sensor 20 may exhibit increased performance with respect to the contact device 10.

Referring to FIG. 8, an example of an ultrasonic image using is shown. In this case, it is assumed that there is no model FFG. Accordingly, an ideal ultrasonic image should have no spots (e.g., no differences in brightness), but a realistic ultrasonic image using may have spots (e.g., some differences in brightness) depending on the material, laminate structure, layout, etc. of the contact device 10.

For example, a uniformity index may be calculated as in Equation 1 below.

$$UI = (b\max - b\min)/UR \qquad \text{[Equation 1]}$$

Here, UI may be a uniformity index, UR may be a reference value, bmax may be the largest (brightest) brightness, and bmin may be the smallest (darkest) brightness. When bmax and bmin are given as fixed values, the uniformity index UI may decrease as the reference value UR increases. A small uniformity index UI may mean close to an ideal ultrasonic image, and indicate that the ultrasonic sensor 20 exhibits effective performance for the contact device 10.

The method and system for calculating a reference value of an ultrasonic sensor according to the present disclosure may calculate a reference value that indicates whether the ultrasonic sensor can exhibit effective performance with respect to a display panel.

The drawings referred to heretofore and the detailed description of the disclosure described above are merely illustrative of the inventive concepts. It is to be understood that the inventive concepts have been disclosed for illustrative purposes only and is not intended to limit the meaning or scope of the invention as set forth in the claims. Therefore, while embodiments have been described with reference to the figures, it will be understood by those of ordinary skill in the art that various changes in form and details may be made therein without departing from the spirit and scope of the disclosure including the following claims.

What is claimed is:

1. A method for calculating a reference value of an ultrasonic sensor comprising:

while an object is positioned on a first surface of a contact device, transmitting a first ultrasonic signal from the ultrasonic sensor toward the first surface;

generating a plurality of ultrasonic images based on a first ultrasonic echo signal;

selecting an ultrasonic image having a highest similarity to a reference image from among the ultrasonic images;

storing a first parameter and a second parameter corresponding to a selected ultrasonic image;

while the object is not positioned on the first surface, transmitting a second ultrasonic signal based on the first parameter from the ultrasonic sensor toward the first surface; and calculating the reference value of the ultrasonic sensor using the second parameter and a second ultrasonic echo signal.

2. The method of claim 1, wherein a larger reference value indicates a smaller deviation of sensing values for each position of the ultrasonic sensor.

3. The method of claim 1, wherein the first parameter is a frequency of the first ultrasonic signal used to generate the selected ultrasonic image.

4. The method of claim 3, wherein the second ultrasonic signal has a frequency corresponding to the first parameter.

5. The method of claim 1, wherein the second parameter is a reception delay time of the first ultrasonic echo signal corresponding to the selected ultrasonic image, from among the generated plurality of ultrasonic images.

6. The method of claim 1, wherein the ultrasonic sensor is positioned on a second surface of the contact device, and
wherein the second surface is a surface opposite to the first surface.

7. The method of claim 6, wherein the contact device has no air gap between the first surface and the second surface.

8. The method of claim 7, wherein the contact device is a display panel.

9. The method of claim 1, wherein the reference value corresponds to a difference between a maximum pressure value and a minimum pressure value of the second ultrasonic echo signal within a specific time range based on the second parameter.

10. The method of claim 1, wherein the reference value corresponds to a median value of pressure values of the second ultrasonic echo signal within a specific time range based on the second parameter.

11. A system for calculating a reference value of an ultrasonic sensor comprising:

a contact device having a first surface;

an ultrasonic sensor configured to transmit an ultrasonic signal toward the first surface and to generate an ultrasonic image based on an ultrasonic echo signal reflected from the ultrasonic signal; and a measuring device configured to calculate the reference value of the ultrasonic sensor using the ultrasonic echo signal, wherein the ultrasonic sensor transmits a first ultrasonic signal while an object is positioned on the first surface, wherein the ultrasonic sensor generates a plurality of ultrasonic images based on a first ultrasonic echo signal, wherein the measuring device selects an ultrasonic image having a highest similarity to a reference image from among the ultrasonic images, and stores a first parameter and a second parameter corresponding to a selected ultrasonic image, wherein the ultrasonic sensor transmits a second ultrasonic signal based on the first parameter while the object is not positioned on the first surface, and wherein the measuring device calculates the reference value of the ultrasonic sensor using the second parameter and a second ultrasonic echo signal reflected from the second ultrasonic signal.

12. The system of claim 11, wherein a larger reference value indicates a smaller deviation of sensing values for each position of the ultrasonic sensor.

13. The system of claim 11, wherein the first parameter is a frequency of the first ultrasonic signal used to generate the selected ultrasonic image.

14. The system of claim 13, wherein the ultrasonic sensor transmits the second ultrasonic signal with a frequency corresponding to the first parameter.

15. The system of claim 11, wherein the second parameter is a reception delay time of the first ultrasonic echo signal used to generate the selected ultrasonic image.

16. The system of claim 11, wherein the ultrasonic sensor is positioned on a second surface of the contact device, and
wherein the second surface is a surface opposite to the first surface.

17. The system of claim 16, wherein the contact device has no air gap between the first surface and the second surface.

18. The system of claim 17, wherein the contact device is a display panel.

19. The system of claim 11, wherein the reference value corresponds to a difference between a maximum pressure value and a minimum pressure value of the second ultrasonic echo signal within a specific time range based on the second parameter.

20. The system of claim 11, wherein the reference value corresponds to a median value of pressure values of the second ultrasonic echo signal within a specific time range based on the second parameter.

* * * * *